United States Patent
Clancy et al.

[11] Patent Number: 5,952,998
[45] Date of Patent: Sep. 14, 1999

[54] TRANSPARENT TOUCHPAD WITH FLAT PANEL DISPLAY FOR PERSONAL COMPUTERS

[75] Inventors: Kevin F. Clancy; Steven D. Holehan, both of Spring, Tex.

[73] Assignee: Compaq Computer Corporation, Houston, Tex.

[21] Appl. No.: 08/784,101

[22] Filed: Jan. 15, 1997

[51] Int. Cl.⁶ .................................................. G08C 21/00
[52] U.S. Cl. .......................................... 345/173; 345/176
[58] Field of Search .................................... 345/156, 157, 345/104, 173, 176; 361/681, 686

[56] References Cited

U.S. PATENT DOCUMENTS

| | | | |
|---|---|---|---|
| 4,838,656 | 6/1989 | Stoddard | 349/150 |
| 4,846,694 | 7/1989 | Erhardt | 434/365 |
| 4,870,458 | 9/1989 | Shibuya et al. | 399/185 |
| 4,882,582 | 11/1989 | Oka | 341/23 |
| 4,952,918 | 8/1990 | Fujita et al. | 345/173 |
| 5,021,640 | 6/1991 | Muroi | 235/462 |
| 5,374,787 | 12/1994 | Miller et al. | 178/18.06 |
| 5,519,520 | 5/1996 | Stoller | 349/32 |
| 5,528,266 | 6/1996 | Arbeitman et al. | 345/173 |
| 5,543,588 | 8/1996 | Bisset et al. | 178/18 |
| 5,644,469 | 7/1997 | Shioya et al. | 361/681 |

*Primary Examiner*—Mark R. Powell
*Assistant Examiner*—Vincent E. Kovalick
*Attorney, Agent, or Firm*—Sharp, Comfort & Merrett, PC

[57] ABSTRACT

A personal computer includes a flat panel or LCD display for displaying computer status information. The display includes an overlying transparent touchpad. When the touchpad is touched, appropriate signals are processed so that movements of the user's finger on the touchpad can be indicated by displaying altered images on the display that correspond to the movement of the user's finger. In this way, the user gets an immediate visual feedback through the LCD display of what changes can be or have been made by touchpad control.

20 Claims, 4 Drawing Sheets

TRANSPARENT TOUCHPAD WITH FLAT PANEL DISPLAY FOR PERSONAL COMPUTERS

BACKGROUND OF THE INVENTION

This invention relates generally to displays for displaying various functions of personal computers and more particularly to the use of a touchpad with a visual display for such devices.

In personal computers, it is highly desirable to provide a number of status indications in a visible form. To this end, many personal computers have displays or icons which indicate AC or DC power, low battery life, use of hard disk drives, or other information which may be displayed on a permanent indicator on or near the keyboard. With some computers, the user can also initiate or select status displays on the personal computer monitor or screen by operating function keys. This allows the user to keep up to date with respect to the condition of the computer and its activities.

In addition, many computers include a touchpad which allows a cursor to be moved on the computer's LCD screen or monitor. Commonly, a touchpad area is provided near the keyboard. The user can touch the touchpad and move his or her finger to move a cursor display on the screen. One such touchpad is disclosed in U.S. Pat. No. 5,374,787, to Miller et al., which is hereby incorporated by reference herein.

It would be desirable to provide a status display for various operations of the computer system which permits the computer user to alter the condition of the computer by appropriate movements on the display. This would provide a convenient and space efficient way to receive this type of information.

SUMMARY OF THE INVENTION

In accordance with one aspect of the present invention, a touchpad for a personal computer includes a substantially transparent substrate. An array of conductive traces are formed on the upper and lower surfaces of the substrate. A flat panel display is situated beneath the substrate so as to project images upwardly through the substrate to enable the computer user to visualize the images. The conductive traces are adapted to allow the user's finger to be capacitively located in response to user proximity. The traces are arranged to permit the image produced by the display to be viewed by the user.

In accordance with another aspect of the present invention, a personal computer includes a microprocessor and memory for controlling the operation of the computer. The microprocessor and memory are contained in a housing. A flat panel display on the housing is connected to the microprocessor. The flat panel display includes a substantially transparent touchpad. The touchpad is situated on top of the display. The touchpad includes a substantially transparent substrate and an array of conductive traces formed on the upper and lower surfaces of the substrate. The touchpad is adapted to convert proximity with the touchpad into signals indicative of the position of the user's finger on the touchpad.

In accordance with still another aspect of the present invention, a method for controlling the operation of a personal computer by monitoring status information includes the step of forming a substantially transparent touchpad having a substantially transparent substrate and an array of conductive traces formed on its upper and lower surfaces. The substrate is situated over a flat panel display. Visual images are produced on the flat panel display in such fashion that the images are arranged to substantially project through the array of traces on the substrate.

DESCRIPTION OF THE PREFERRED EMBODIMENTS

Figure 1:
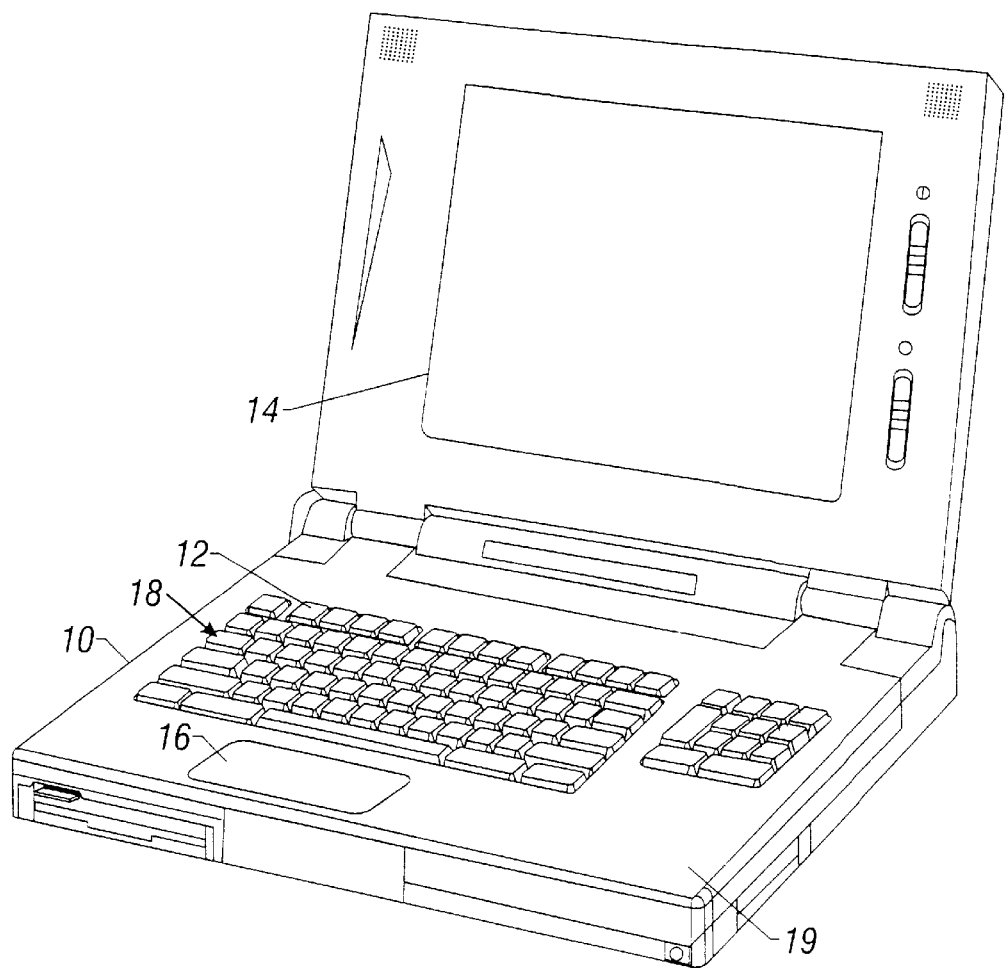
FIG. 1 is a perspective view of one embodiment of a personal computer in accordance with the present invention.

Referring to the drawings wherein like reference characters are utilized for like parts throughout the several views, a personal computer 10, shown in FIG. 1, has a conventional keyboard 18 with function keys 12, a liquid crystal display screen 14, and a flat panel or liquid crystal display (LCD) touchpad 16 shown in position at the lower portion of the keyboard enclosure 19. As explained hereinafter, although the present invention has been illustrated as being implemented in connection with a notebook personal computer, it would be apparent to those skilled in the art that the invention could also be implemented on any other type or size of personal computer.

Figure 3:
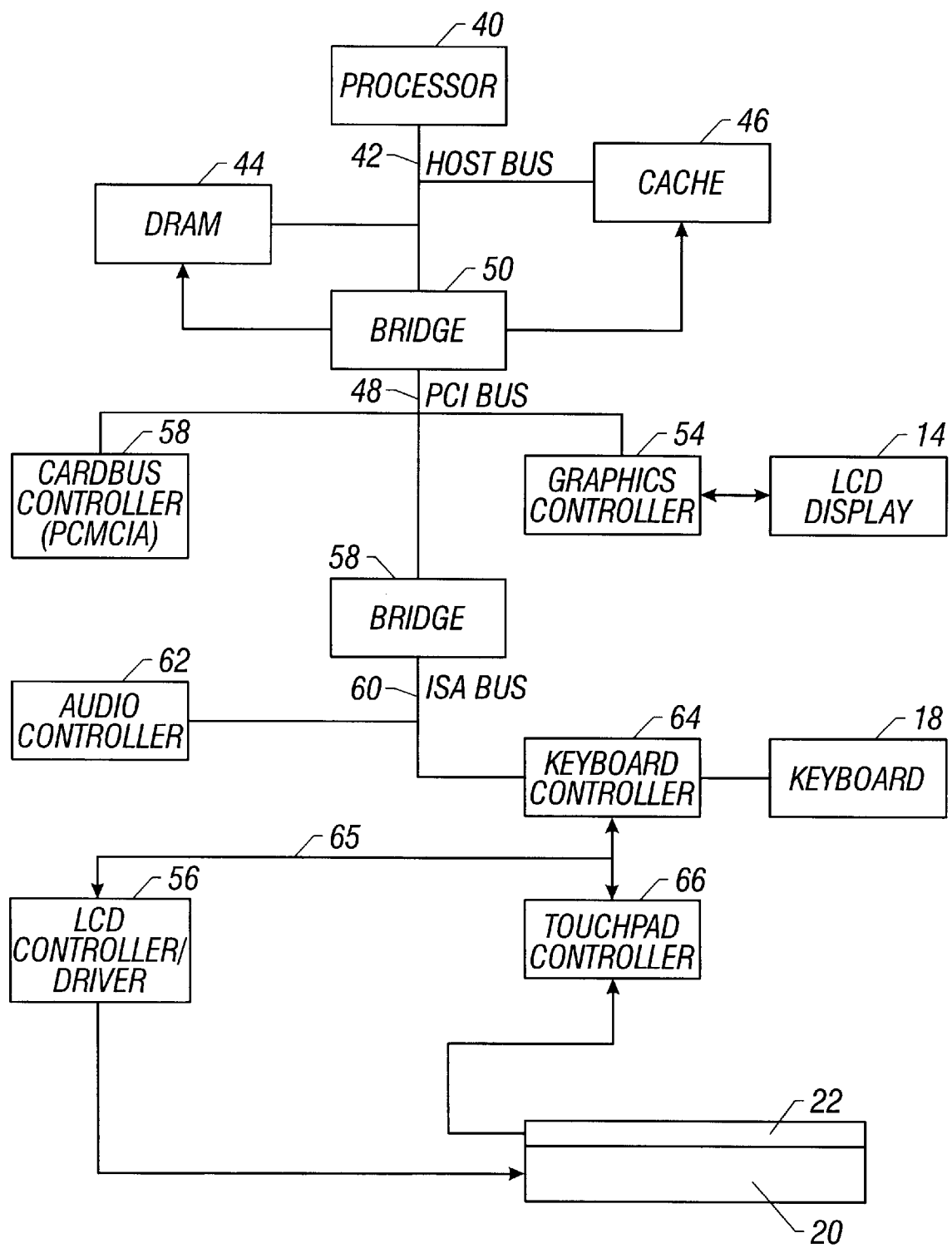
FIG. 3 is a schematic block diagram showing the hardware for implementing one embodiment of the present invention.

The touchpad 16 is an integrated touchpad which includes a display 20 viewable through a transparent touchscreen 22, as shown in FIG. 3. Underneath the transparent touchscreen 22 is a conventional display 20 sized to fit in an appropriate location in the keyboard enclosure 19. While an LCD display is advantageous as the display 20, other light sources such as LEDs may be used to provide useful information to the computer user through a flat panel display. Thus, the user can touch the touchpad 16 and in so doing, activate the transparent touchscreen 22 to provide an indication of where the user has contacted the touchpad 16.

Figure 2:
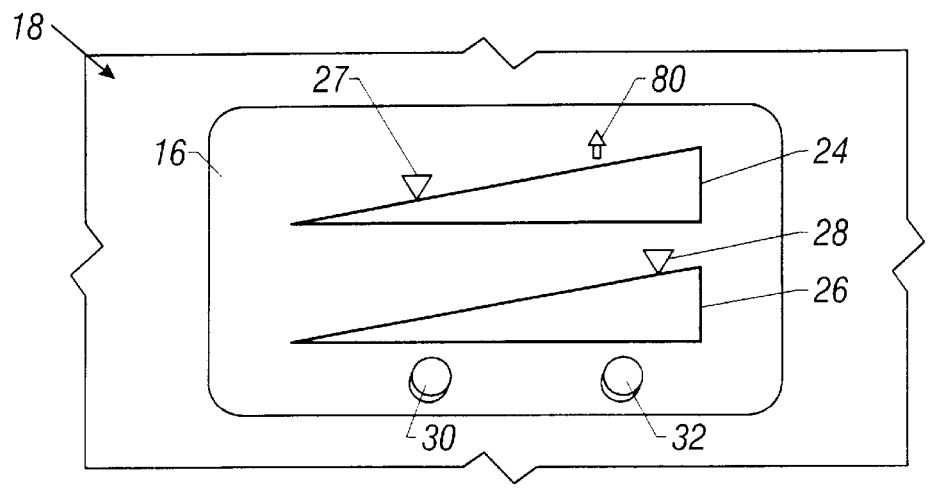
FIG. 2 is an enlarged front elevational view of the LCD touchpad display shown on the keyboard enclosure of the computer in FIG. 1.

Referring to FIG. 2, a pair of ramp-shaped images 24 and 26 with pointers 27 and 28 and a pair of images 30 and 32 which appear like mouse buttons are displayed. The button images 30 and 32 can be touched or pressed to operate like conventional mouse buttons. However, the button images 30 and 32 are virtual mouse buttons since they only appear on the screen and are activated when touch or proximity is detected by the touchscreen 22. The button image 32 is illustrated as being pressed and the button image 30 is shown as unpressed in FIG. 2.

The position of the pointers 27 and 28 can be adjusted by manually touching a pointer 27 or 28 and moving it along the inclined surface of each ramp. As the pointer is moved by the user touching it and moving his or her finger along the ramp-shaped image 24 of 26, the visual display of the pointer 27 or 28 is altered by changing the depiction on the display 20 in accordance with the movement of the user's finger. Thus, the user can use the images 24 and 26 as an adjustable scale for inputting control information to the computer 10. Information can also be inputted in some cases using a stylus or pen.

A variety of screen formats or menus can be produced on the touchpad 16 through the function keys 12. In this way, the user can select a desired menu from a series of menus to input particular control selections. For example, status indications implemented by distinct menus selected by the function keys 12 could include whether magnetic storage devices are operational, the remaining computer battery life, screen brightness or contrast, power conservation settings and other information conventionally displayed on the keyboard 18 or on demand on the display 14 of personal computers. Also, a conventional mouse pointer screen can be implemented whereby the user can touch and move the displayed pointer 80, as shown in FIG. 2. In this way, a large amount of information may be transferred in the relatively small space currently occupied by pointing devices in conventional notebook computers.

Referring to FIG. 3, the computer 10 may be implemented using a processor 40 connected by a host bus 42 to DRAM memory 44 and cache memory 46 in conventional fashion. The host bus 42 may be connected to a Peripheral Component Interconnect or PCI bus 48 by a conventional bridge 50. The bridge 50 coordinates communications between the host bus 42 and PCI bus 48.

Connected to the PCI bus 48 may be any of the devices conventionally connected to a PCI bus. For example, a card bus controller 52 may be connected to the PCI bus to implement a PCMCIA system using conventional PCMCIA cards (not shown) that may be plugged into the personal computer 10. In addition, a graphics controller 54 is provided to handle the production of images on the LCD display 14.

The PCI bus 48 may be connected by a bridge 58 to a conventional Industry Standard Architecture or ISA bus 60. A variety of conventional devices may be connected to the ISA bus 60, as depicted in FIG. 3, including the audio controller 62 and the keyboard controller 64. The keyboard controller 64 receives inputs from a conventional keyboard 18 as well as from the touchpad controller 66. Also, the LCD controller/driver 56 is used to drive the display on the LCD display 20.

The touchpad controller 66 receives electrical signals from the substantially transparent touchscreen 22 indicative of the current coordinates of any contact or proximity with the touchpad 16. It converts these signals into a form which is conventionally handled by keyboard controller 64 including those produced by rollerball or other conventional pointing devices. For example, the PS/2 keyboard/mouse communication protocol can be used to communicate with the touchpad 16. Alternatively, an inter-IC ($I^2C$) bus, or a universal serial bus (USB) 65 connects the LCD controller/driver 56 and the keyboard controller 64. The touchpad controller 66 converts the analog signals from the touchscreen 22 into digital signals and provides analog filtering and signal conditioning.

In use, the user simply presses the appropriate function keys 12 in order to cause the desired display or menu to appear on the touchpad 16. The user then can adjust the controls for the processor 10 by making manual movements on the touchpad 16. For example, as shown in FIG. 2, the user can move the cursors 27 or 28 to increase the volume of the audio, for example, in a multimedia system or to adjust screen 14 brightness.

As the cursors 27 and 28 are moved, inputs are provided to the LCD driver 56 and graphics controller 54 which shift the LCD image on the screen 20 to conform the virtual movements of the cursors 27 and 28 to the movement of the user's finger. In other words, as the user moves his or her finger over the LCD touchpad 16, a cursor 27 or 28, acting as a scale indicator, moves with the user's finger. Alternatively, the amount of shading inside each ramp-shaped image 24 or 26 may be increased or decreased to act as a scale indicator. The LCD image will appear to be displaced to the position where the user removes his or her finger from the LCD touchpad 16.

In this way, the user can cycle through a wide variety of computer controls using a very limited surface on the keyboard 18. The user can then adjust any controls that are desired in an advantageous way because the touchpad 16 provides immediate visual feedback and an immediate graphical indication of what changes have been made.

Figure 4:
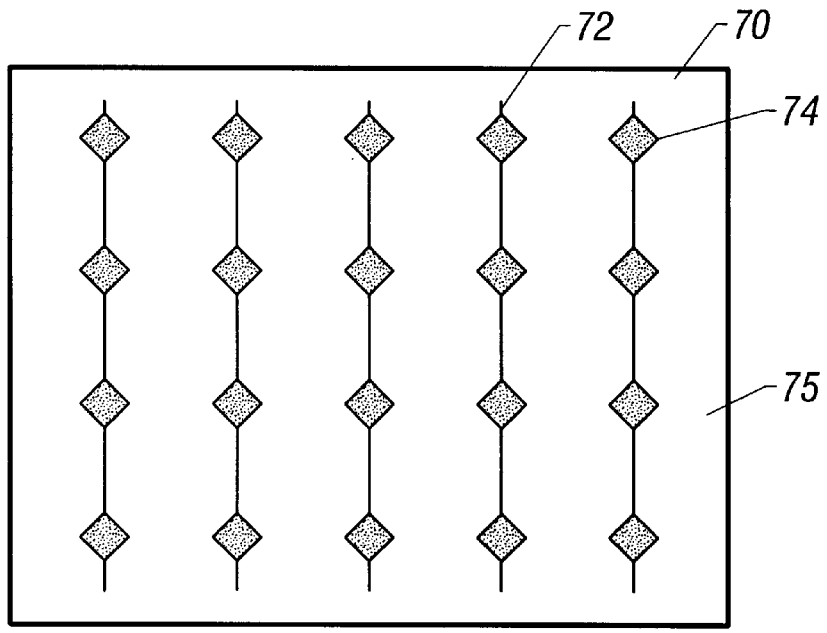
FIG. 4 is a top, front elevational view of a touchscreen in accordance with one embodiment of the present invention.

Referring now to FIG. 4, a technique for forming the transparent touchscreen 22 is illustrated. The touchscreen 22 may be formed from a membrane 70 which is preferably substantially transparent to light. A plurality of conductive traces 72 having capacitive elements 74 are formed on the upper surface of the membrane 70.

The membrane 70 may be formed of a variety of materials, including Mylar and transparent plastic film, advantageously made as thin as possible for the application. The traces 72 may be formed by printing a suitably conductive ink on the membrane 70 so as to allow conduction along the traces 72. For example, the conductive materials forming the trace 72 and the capacitive elements 74, may be formed by silkscreening or other printing techniques.

The traces 72 and capacitive elements 74 may be formed of substantially transparent conductive material, such as indium tin oxide or "ITO" deposited by conventional techniques, such as sputter deposition and etched to appropriate shapes. Any other conventionally available transparent conductive materials may be used to form the traces 72 and the capacitive elements 74.

Figure 5:
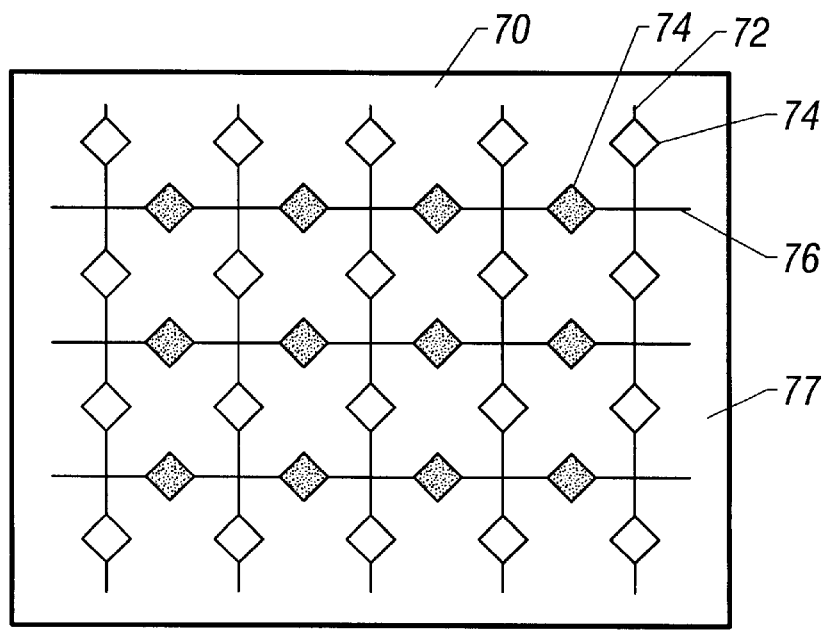
FIG. 5 is a bottom, front elevational view of the touchscreen shown in FIG. 4.

The lower side 77 of the membrane 70, as shown in FIG. 5, also may have traces formed on it. Advantageously, the traces 76 include capacitive elements 74 and run generally transversely to the direction that the traces 72 extend on the opposite surface 75. Thus, in FIG. 5, since the membrane 70 is substantially transparent, the traces 72 on the upper surface 75 are shown in dotted lines as they would be viewed through the substantially transparent membrane 70.

Figure 6:
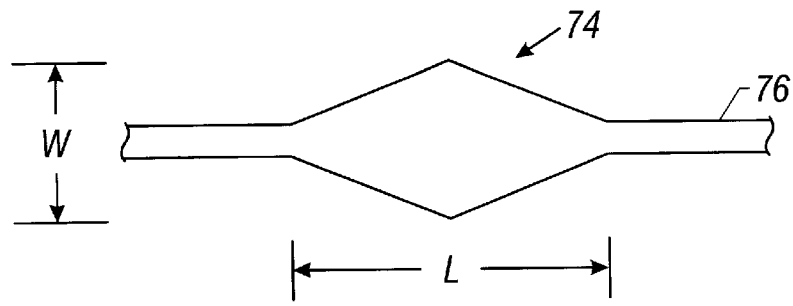
FIG. 6 is an enlarged view of one of the capacitive elements shown in FIG. 5.

Each of the capacitive elements 74 may be formed with its length "L," measured along a trace 72 or 76, substantially greater than its width "W" measured transversely to the trace 72, 76 length, as shown in FIG. 6. In the illustrated embodiment, a diamond shaped element 74 is illustrated but other geometric shapes are also possible. By making the capacitive element 74 length substantially greater than its width, interference with light passing through the touchscreen 22 may be lessened. Advantageous, the capacitive element 74 aspect ratio (L/W) is greater than 2.

Figure 7:
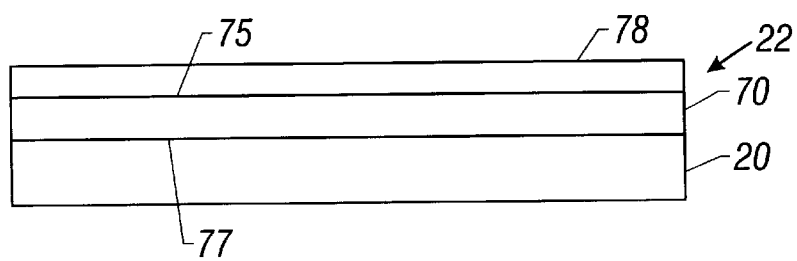
FIG. 7 is a side elevational view of the touchscreen shown in FIG. 4 on top of an LCD display.

The construction of the touchscreen 22, as shown in FIG. 7, may include an upper layer 78 which may conveniently be a transparent plastic film. The purpose of the layer 78 is to avoid removal of the conductive traces 72 through touching and to provide a protective layer for the membrane 70. Thus, the layer 78 may be very thin. The membrane 70 may be secured to the lower surface of the layer 78 such that its upper surface 75 and lower surface 77 are arranged one above the other, and the membrane 70 acts as a dielectric to separate the conductive traces. A screen 20 is then secured below the layer 77.

The traces 72 and 76 form an array that detects the position of the user's finger on or near the touchscreen 22 through capacitive effects. The traces 72 and 76 may, in some embodiments, also provide information about the size of the finger contact and this information may be used to determine finger pressure.

A single sensor processor chip (not shown) can be connected to the traces 72 and 76. The traces 72 and 76 may be driven and sensed in parallel. For example, the voltages on all of the traces 72 may be changed while the voltages on the traces 76 are kept constant. Thereafter, all of the traces 76 are subjected to a changing voltage while the traces 72 are kept at a constant voltage. The elements 74 then apply a capacitive effect to the extent that the user's finger is proximate. The circuitry for decoding the signals received as a result of scanning in this fashion is well known, as disclosed for example, in the aforementioned U.S. Pat. No. 5,374,787.

Figure 8:
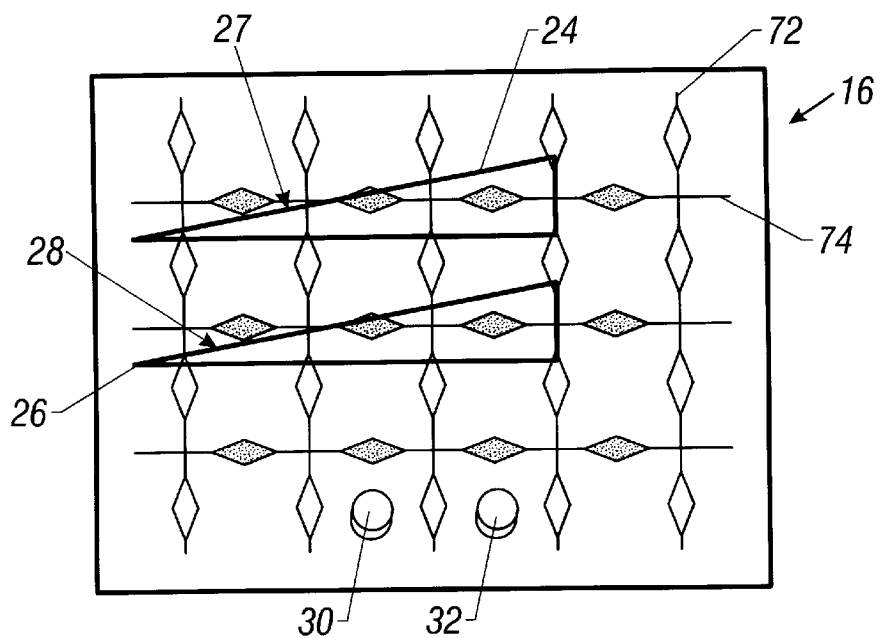
FIG. 8 is a top, front elevational view of the display shown in FIG. 7 in operation.

As shown in FIG. 8, through appropriate arrangement of the traces 72 and 76, images may be projected by the LCD display 20 through the transparent membrane 70 and layer 78, for viewing by the user. In the case where the traces 72 and 76 are not completely transparent, the capacitive elements and traces may interfere to some degree with the image. However, by making the image sufficiently bold, positioning it appropriately, and sizing the array of traces 72 and 76 to leave substantial room for light to project through the array, adequate visualization can be achieved.

Thus, referring to FIG. 8, the ramp-shaped images 26 and 28 are positioned to avoid the predominant capacitive elements 74 and the cursors 27 and 28 are sized sufficiently large to be viewed even if they are partially obscured by capacitive elements 74 or traces 72 or 76. Similarly, the mouse button images 30 and 32 may be deliberately positioned between the traces 72 and 76 so as not to be substantially obscured by the array of conductive traces 72 and 76.

While the present invention has been described with respect to a limited number of embodiments, those skilled in the art will appreciate numerous modifications and variations therefrom. It is intended that the present invention should only be limited by the following claims.

What is claimed is:

1. A touchpad for a personal computer comprising:
   a substantially transparent substrate having upper and lower surfaces;
   a series of nontransparent conductive traces formed on the upper and lower surfaces of said substrate to form an array operable to capacitively sense a location of an object placed in proximity to the substrate, said traces having a series of capacitive elements arranged along said traces, said capacitive elements being shaped to have a length along said traces which is substantially greater than their width measured transversely to the length of said traces; and
   a display, situated beneath said substrate so as to project a image upwardly through said substrate to enable a computer user to visualize said image, said image being arranged so as to substantially avoid interference from said capacitive elements.

2. The touchpad of claim 1 wherein said display is a liquid crystal display.

3. The touchpad of claim 2 including a substantially transparent layer situated on top of said substrate.

4. The touchpad of claim 1 wherein said elements are diamond shaped.

5. The touchpad of claim 1, wherein said display is comprised of light emitting diodes.

6. The touchpad of claim 1, wherein the image arranging includes positioning and shading said image.

7. A touchpad for a personal computer comprising:
   a substantially transparent substrate;
   an array of conductive traces formed on the upper and lower surfaces of said substrate;
   wherein said conductive traces include a series of capacitive elements arranged along said traces to allow finger position to be capacitively determined;
   wherein said capacitive elements have a length along the traces which is substantially greater than their width measured transversely to the length of said traces:
   wherein the aspect ratio of said elements is greater than 2; and
   a flat panel display situated beneath said substrate so as to project images upwardly through said substrate to enable the computer user to visualize said images, said conductive traces being adapted to allow the user's finger to be located in response to user proximity said traces being arranged so as to permit the image produced by the display to be viewed by the user.

8. A personal computer, comprising:
   a microprocessor and memory for controlling the operation of said computer;
   a housing containing said microprocessor and memory;
   a touchpad attached to said housing and coupled to said microprocessor, comprising:
      a substantially transparent substrate; and
      a series of nontransparent conductive traces on an upper and lower surface of said substrate to form an array operable to capacitively sense a location of an object placed in proximity to the substrate, said traces having a plurality of capacitive elements positioned along said traces, each capacitive element being shaped to have a length along said traces substantially greater than its width measured transversely to the length of said traces; and
   a display situated beneath said touchpad, coupled to said microprocessor, and operable to project an image, said image being arranged to project through said touchpad without substantial interference from said capacitive elements.

9. The computer of claim 8 including a substantially transparent layer situated on top of said substrate.

10. The computer of claim 8 wherein said elements are diamond shaped.

11. The computer of claim 8 wherein said display is a liquid crystal display.

12. The personal computer of claim 8, wherein said display is comprised of light emitting diodes.

13. The personal computer of claim 8, wherein the image arranging includes positioning and shading said image.

14. A personal computer comprising:
   a microprocessor and memory for controlling the operation of said computer;
   a housing containing said microprocessor and memory;
   a flat panel display on said housing connected to said microprocessor, said flat panel display including a substantially transparent touchpad, said touchpad situated on top of said display, said touchpad including a substantially transparent substrate and an array of conductive traces formed on the upper and lower surfaces of said substrate, wherein said conductive traces include a series of capacitive elements arranged along said traces to allow finger position to be capacitively determined, wherein said capacitive elements have a length along the traces which is substantially greater than their width measured transversely to the length of said traces, wherein the aspect ratio of said elements is greater than 2, said touchpad being adapted to convert proximity with said touchpad into signals indicative of the position of the user's finger on said touchpad.

15. A method for controlling the operation of a personal computer by monitoring various status information, said method comprising the steps of:

forming a series of nontransparent conductive traces on an upper and lower surface of a substantially transparent substrate;

forming a series of capacitive elements along said traces, said capacitive elements being shaped to have a length along the traces of at least twice their width measured transversely to the length of the traces;

positioning said substrate over a display; and arranging images for said display to project in such fashion that said images substantially avoid interference from said capacitive elements.

16. The method of claim 15, wherein the step of forming conductive traces includes forming a series of parallel traces on an upper surface of the substrate and forming a series of parallel traces on the lower surface, the upper surface traces being substantially perpendicular to the lower surface traces, the upper and lower surface traces together forming an array of apertures for passing the image in an orthogonal direction through the substrate.

17. The method of claim 16 including the step of determining the position of a user's finger on said touchpad using said traces.

18. The method of claim 15, wherein said display is a liquid crystal display.

19. The method of claim 15, wherein the display is formed with at least one light emitting diode.

20. The method of claim 15, wherein the image arranging step includes positioning and shading said image.

* * * * *